United States Patent [19]

Hörmann

[11] Patent Number: 5,108,828

[45] Date of Patent: Apr. 28, 1992

[54] GATE-PANEL ELEMENT

[75] Inventor: Michael Hörmann, Steinhagen, Fed. Rep. of Germany

[73] Assignee: Hörmann KG Brockhagen, Steinhagen/Brockhagen, Fed. Rep. of Germany

[21] Appl. No.: 257,986

[22] Filed: Oct. 14, 1988

[30] Foreign Application Priority Data

Oct. 26, 1987 [DE] Fed. Rep. of Germany ....... 3736210

[51] Int. Cl.⁵ .............................................. B23B 7/00
[52] U.S. Cl. ....................................... 428/246; 49/73; 156/306.6; 156/309.6; 428/251; 428/252; 428/284; 428/285; 428/287; 428/423.1; 428/423.5
[58] Field of Search ............... 428/246, 252, 284, 285, 428/287, 423.1, 423.5, 251; 49/73; 156/306.6, 309.6

[56] References Cited

U.S. PATENT DOCUMENTS 4,025,687 5/1977 Woolen et al. .................... 428/319.3
4,292,363 9/1981 Briggs ................................. 428/255

Primary Examiner—James J. Bell
Attorney, Agent, or Firm—Max Fogiel

[57] ABSTRACT

Gate-panel element for a gate panel preferably made out of a number of such elements, a ceiling-component gate panel for example, with a space between outer layers, especially made of sheet metal, that enclose each other, and with a core, made of plastic, especially expanded plastic, that completely occupies the space. The element, in order to save weight, has a layer of plastic fibers against each surface of the outer layers that faces the core.

10 Claims, 2 Drawing Sheets

GATE-PANEL ELEMENT

Gate-panel elements of the type in question can basically be single-piece gate panels, although they can also be gate panels composed of several segments and again those that, rigidly associated with one another for example, constitute a sliding-gate panel or, articulated in series, a correspondingly movable gate panel, a sliding and rolling gate panel or a ceiling-component gate panel for example. Gate-panel elements or segments of this type are, in the simplest embodiment, composed of a single layer of sheet metal, although gate panels and in particular segments in the form of what are called hollow plates, foamed between two outer walls made of sheet steel are also known. Outer coatings that result in acoustic attenuation, increased weather resistance, etc. have simultaneously been provided. The strength of such hollow plates or gate-panel elements depends on the thickness of the particular sheet steel employed, which also, however, increases the weight of the panel. This leads to limitations on the size of the gate panel, especially those that are moved vertically.

The object of the invention is to manufacture lighter-weight gate panels or those for higher gates without increasing their weight to the extent that the coatings already used for smaller gates can no longer be employed.

With a gate-panel element having the characteristics recited in the preamble to claim 1 as a point of departure, this object is attained in accordance with the invention by the characteristics recited in the body thereof.

It is accordingly proposed in accordance with the invention that the inner surface of the outer layers, which are in particular made out of sheet metal, be provided with a coating of plastic fibers, especially a web of woven plastic, of aramide fibers for example. The strength of a woven plastic web of this type is one multiple higher than that of the particular sheet steel employed. This makes it possible to decrease the thickness of the cover-panel metal layers, and especially therefore the thickness of the covering sheet metal, to a very great extent, which leads to a corresponding saving of weight because the plastic-fiber lamination is essential lighter than the sheet metal.

A preferred embodiment employs a woven plastic fabric of this type that is especially resistant to tension in a preferred direction. The layer of plastic fiber is then oriented with the direction of resistance to tension coinciding with that in which the segments are arranged in series. This direction will generally be, in accordance with most of the types of interest in the present context, that in which the gate panel moves. In this way it becomes possible, with a covering of the same thickness, to obtain a composite of sheet steel and an adherent woven plastic-fiber fabric that will be light in weight and far stronger, especially along the direction of tension. This will make it possible to secure correspondingly larger gate panels with the same fastening mechanisms.

In one especially preferred embodiment, the plastic-fiber layer is a textile or mat that can, adapted if necessary to the plastic, especially expanded plastic, that constitutes the core of the gate-panel element or segment between the outer layers, be penetrated to some extent by the plastic. Since the plastic, especially polyurethane foam, has specific adhesive properties, the penetrating constituents will create a secure bond not only between each cover sheet and its adjacent plastic-web mat but also with the core. This represents an especially simple manufacturing method of obtaining a bond between all the individual components that participate in establishing the gate-panel element or segment in the course of expanding the plastic foam.

It is of course also possible to secure the plastic-fiber lamination to the inner surface of the outer layers in a separate bonding process, especially by cementing.

In the event of separate cementing, it is of course also possible to do without a double-walled plate filled with plastic. A considerable increase in strength accompanied by decreased weight can also be attained with a single-walled outer lay of sheet metal with an appropriate plastic-fiber lamination. This also holds of course for double-walled plates that remain hollow inside.

From the aspect of manufacturing technology, it is possible to proceed by coating the facing sides of the two outer layers with a plastic-fiber fabric or just applying it to them before they are brought together to create the space for the core and then, once they have been brought together, filling the space with the plastic, especially the foam. It is simultaneously possible as previously described herein, to use a kind of plastic that, if the plastic-fiber mat is porous enough, will also cement it to the outer sheet metal.

It is accordingly possible to create an outer skin about 0.5 mm thick from a very thin sheet of metal, 0.28 mm for example and a correspondingly thin, 0.22 mm, layer of plastic-fiber fabric. If a very strong plastic fiber is employed and oriented parallel to the direction of tension, the resistance to tension will be approximately 20 times higher than that of the sheet of steel alone, although the specific weight of the fiber layer will be only a fraction of that of the sheet of steel. Glass fibers, especially aramide fibers, a hydrocarbon compound, are appropriate fibers.

At the same thickness as that of the previously employed 0.5-mm sheet steel, the resistance to tension of the new outer skin will be approximately 10 times higher, although its weight is considerably lower. It is for this reason possible to build essentially larger and especially wider gates and cover them with the conventional coatings. This is a particular advantage.

The invention will now be specified with reference to the embodiment illustrated in the drawing.

Figure 1:
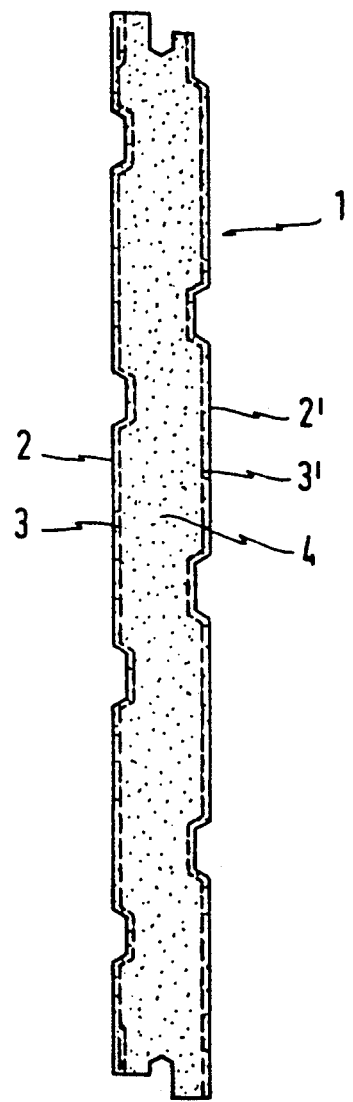
FIG. 1 is a section through the segment of a gate panel in the form of a foam-filled hollow plate. Gate-panel segment 1 has two outer layers 2 and 2' in the form of thin sheets of metal with a woven plastic-fiber mat 3 and 3' against each of their facing inner surfaces. The space between the outer layers or woven plastic-fiber mats is completely occupied by a core 4 made of expanded plastic. The expanded plastic can as illustrated penetrate woven plastic-fiber mats 3 and 3', which are porous or provided with appropriate openings, as far as the inner surfaces of outer layers 2 and 2'. The materials properties of the expanded plastic ensure cementing. The pores in the woven plastic-fiber mats, however, are not large enough for core 4 to position the mats against the inner surface of the outer layers when the plastic is expanded.
Figure 2:
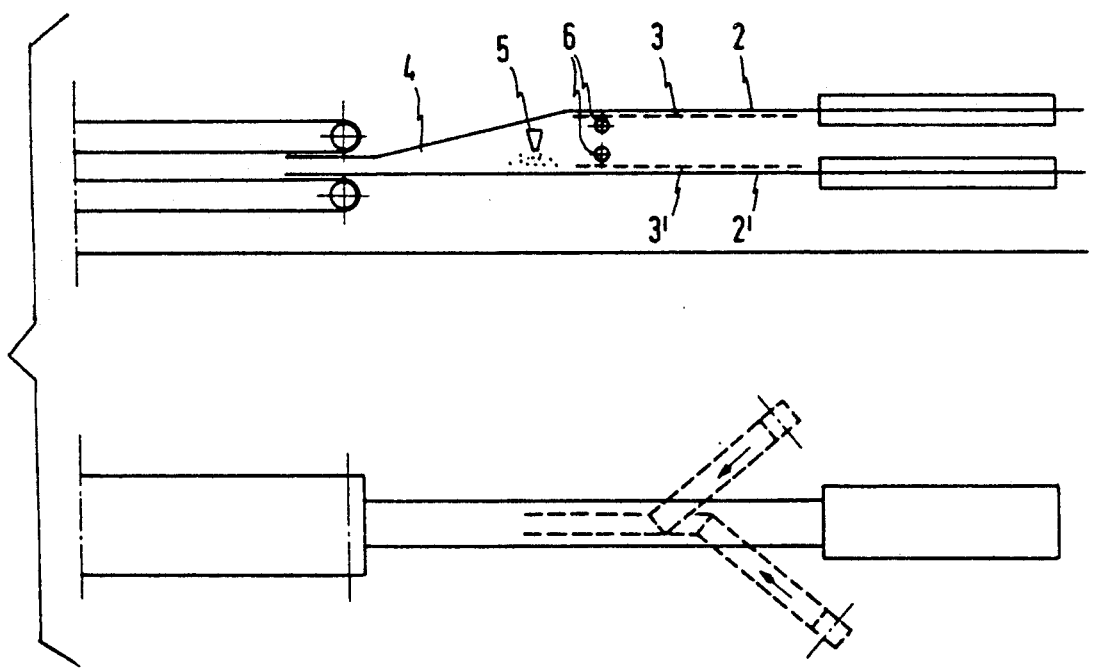
FIG. 2 schematically represents how a segment of this type can be mechanically manufactured. The outer and inner cover sheets are guided through a structuralsection tool and provided within a specific infeed section with woven plastic-fiber mats, which are glass-fiber mats in the illustrated embodiment, as can be seen from above. Once the mats have been introduced, the plastic is supplied in the vicinity of a nozzle 5. The overall structure is the reduced to the requisite thickness by means of a belt of plates.

In departure from the Figure, it is of course also possible to supply the glass-fiber mats not from the side but, as with the strips of sheet metal, longitudinally.

Rollers 6 position woven plastic-fiber mats 3 and 3' against the associated inner surfaces of outer layers 2 and 2'.

Depending on the particular layer or woven mat of synthetic fibers employed, it is possible to attain high enough strengths to ensure a door or gate panel that is secure against explosions and will impede artillery shells.

I claim:

1. An element for a gate panel comprising: a plurality of adjacent members connected together to form a gate panel for a sliding gate, rolling gate, or ceiling-component gate; two outer layers of sheet metal enclosing a hollow space between said outer layers; a core of plastics filling said hollow space; two plastic fiber layers in form of a woven fabric or a mat; said plastic fiber layers having a preferred tensile direction and being oriented in a direction corresponding to the direction of motion of said gate panel; each plastic fiber layer having an inner surface facing said core and lying against one of said two outer layers; said plastics of said core penetrating said plastic fiber layers and gripping adhesively the inner surfaces of said outer layers.

2. An element for a gate panel as defined in claim 1, wherein said plastic fiber layers comprise matts of aramide fibers.

3. An element for a gate panel as defined in claim 1, wherein said plastic core comprises plastic foam.

4. An element for a gate panel as defined in claim 1, wherein said plastic core comprises polyurethane foam.

5. A method as defined in claim 1, and pressing against the inner surfaces of said outer layers with said plastic fiber layers in tension; and connecting adhesively to form a single unit said plastic fiber layers with said core.

6. An element for a gate panel as defined in claim 1, wherein said members are rigidly connected together to form a rigid gate panel for a sliding gate.

7. An element for a gate panel as defined in claim 1, wherein said members are pivotably connected together in series to form a movable gate panel, a sliding and rolling gate panel or a ceiling-component gate panel.

8. A method for producing an element for a gate panel comprising the steps: providing a plurality of adjacent members connected together to form a gate panel for a sliding gate, rolling gate, or ceiling-component gate; bringing together two outer layers of sheet metal individually; for each member; applying two layers of plastic fibers to said outer layers facing each other before said outer layers come into contact; introducing expanded plastic to form a core between said two layers of plastic fibers, said plastic fiber layers having a preferred tensile direction and being oriented in a direction corresponding to the direction of motion of said gate panel; providing each plastic fiber layer with an inner surface; locating each plastic fiber layer with said inner surface facing said core and lying against one of said two outer layers; penetrating partially said plastic fiber layers with said core and gripping adhesively the inner surfaces of said outer layers.

9. An element for a gate panel as defined in claim 1, wherein said element is resistive to mechanical loading and being movable under tensile stresses; said plastic fiber layers reinforcing said outer layers and having a structure to resist maximum tensile forces lying in a predetermined plane and in a predetermined direction corresponding to the direction of motion of said gate panel.

10. A method for producing an element for a gate panel comprising the steps: providing a plurality of adjacent members connected together to form a gate panel for a sliding gate, rolling gate, or ceiling-component gate; bringing together two outer layers of sheet metal individually; for each members; applying two layers of plastic fibers to said outer layers facing each other before said outer layers come into contact; introducing expanded plastic to form a core between said two layers of plastic fibers, said plastic fiber layers having a preferred tensile direction and being oriented in a direction corresponding to the direction of motion of said gate panel; providing each plastic fiber layer with an inner surface; locating each plastic fiber layer with said inner surface facing said core and lying against one of said two outer layers; penetrating partially said plastic fiber layers with said core and gripping adhesively the inner surfaces of said outer layers; said element being resistive to mechanical loading and being movable under tensile stresses; said plastic fiber layers reinforcing said outer layers and having a structure to resist maximum tensile forces lying in a predetermined plane and in a predetermined direction corresponding to the direction of motion of said gate panel; said outer layers comprising sheet metal; said plastic fiber layers comprising glass fiber layers; said core comprising plastic foam.

* * * * *